United States Patent
Teboulle

(12) 
(10) Patent No.: US 11,296,826 B2
(45) Date of Patent: Apr. 5, 2022

(54) FRAME ACKNOWLEDGEMENT METHOD

(71) Applicant: SAGEMCOM ENERGY & TELECOM SAS, Rueil Malmaison (FR)

(72) Inventor: Henri Teboulle, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 0 days.

(21) Appl. No.: 16/861,429

(22) Filed: Apr. 29, 2020

(65) Prior Publication Data

US 2020/0366416 A1     Nov. 19, 2020

(30) Foreign Application Priority Data

May 13, 2019 (FR) ...................................... 1904959

(51) Int. Cl.
*H04B 7/00* (2006.01)
*H04L 1/16* (2006.01)

(52) U.S. Cl.
CPC .................................. *H04L 1/1621* (2013.01)

(58) Field of Classification Search
CPC ......... H04W 84/18; H04W 4/70; H04W 4/80; H04W 24/02; H04L 69/08; H04L 1/1621
See application file for complete search history.

(56) References Cited

U.S. PATENT DOCUMENTS

| | | | |
|---|---|---|---|
| 9,942,010 B1 | 4/2018 | Chu et al. | |
| 2006/0245425 A1* | 11/2006 | Mathis | H04W 92/02 370/389 |
| 2006/0291455 A1* | 12/2006 | Katz | H04W 12/068 370/355 |
| 2007/0171852 A1* | 7/2007 | George | H04W 88/06 370/328 |
| 2007/0280230 A1* | 12/2007 | Park | H04L 12/4633 370/390 |
| 2010/0217837 A1* | 8/2010 | Ansari | H04L 41/12 709/218 |
| 2013/0044661 A1* | 2/2013 | Jokimies | H04W 52/0274 370/311 |
| 2016/0072708 A1* | 3/2016 | Field | H04L 45/64 370/221 |
| 2017/0366194 A1* | 12/2017 | Sennoun | H04W 16/18 |

(Continued)

OTHER PUBLICATIONS

"9. Frame Formats 9.1 General requirements" IEEE Draft, vol. 802.11m drafts, May 7, 2019.

(Continued)

*Primary Examiner* — Atique Ahmed
(74) *Attorney, Agent, or Firm* — Oliff PLC

(57) ABSTRACT

Method enabling an application server to acknowledge, with a single acknowledgement frame, a set of frames sent by endpoints in a group of endpoints to said application server. Each endpoint in said group communicates with the application server via a gateway and a centralising server. The application server is connected to the centralising server via a first communication network. The centralising server is connected to each gateway by a second communication network. The group of endpoints and each gateway form a LoRa network, each communication between an endpoint in said group and a gateway using the LoRaWAN protocol.

16 Claims, 5 Drawing Sheets

(56) References Cited

U.S. PATENT DOCUMENTS

2018/0006961 A1* 1/2018 Guibene ................ H04L 47/70
2018/0132177 A1* 5/2018 Gandhi ............. H04W 52/0235
2019/0104472 A1 4/2019 Teboulle et al.

OTHER PUBLICATIONS

Jan. 17, 2020 French Search Report issued in French Patent Application No. 1904959.

* cited by examiner

FRAME ACKNOWLEDGEMENT METHOD

The invention relates to a method for acknowledging frames sent by endpoints in a group of endpoints intended for an application server, each endpoint in said group communicating with the application server via a gateway and a centralising server, to devices, and to a system implementing said method.

The internet is gradually being transformed into a wide area network, called the "Internet of Things", connecting all kinds of objects that have become connectable. New requirements in terms of networks have then appeared, and in particular requirements for wireless networks having greater coverage than conventional cellular networks and making it possible to limit energy consumption of the connected equipment. Among these long-range wireless networks allowing low energy consumption (low power wide area network (LPWAN)), mention can be made of networks based on the LoRa (registered trade mark) (long range) technology. LoRa technology operates on frequency bands known by the term "ISM band" (industry, science and medical) comprising frequency bands that can be used freely for industrial, scientific and medical applications. LoRa technology is based on a spread spectrum technology making it possible to obtain low-bitrate communications having good robustness in a particularly noisy ISM band.

A network based on LoRa technology (hereinafter called a "LoRa network") uses a protocol called LoRaWAN (LoRaWAN 1.1 Specification, final release, 11 Oct. 2017). A LoRa network is composed of base stations or gateways generally placed on high points in order to cover a large geographical area. The gateways are able to detect messages sent in their area by equipment or endpoints and to transfer them to at least one server (LoRa network server (LNS)), hereinafter referred to as an LNS server or centralising server, which will process them or retransmit them to one or more application servers.

In a conventional functioning of a LoRa network, an endpoint wishing to transmit a message (i.e. data) to the LNS server or to a centralising server via the LNS server, transmits this message in a frame, called an uplink frame, in accordance with the LoRaWAN protocol. The uplink frame in accordance with the LoRaWAN protocol, referred to as an uplink LoRa frame, is transmitted in broadcast mode. This uplink LoRa frame is received by at least one gateway. Each gateway that has received the uplink LoRa frame decodes it and retransmits the message contained in said frame to the server in an HTTP (HyperText Transfer Protocol) request, referred to as an uplink HTTP request. If a plurality of gateways have received the uplink LoRa frame, the LNS server receives a plurality of uplink HTTP requests containing the same message. The LNS server must then designate, among the gateways that received the uplink LoRa frame, the gateway to be used for relaying a response to the message contained in the uplink LoRa frame. The response is transmitted from the LNS server to the designated gateway in a downlink HTTP request, then in unicast, from the designated gateway to the endpoint in a downlink frame in accordance with the LoRaWAN protocol, referred to as a downlink LoRa frame. In a majority of implementations of LoRa networks, the designated gateway is the one offering the best quality of transmission with the endpoint that sent the uplink LoRa frame.

The LoRaWAN protocol defines three operating classes: the classes A, B and C. The class A is the most economical in terms of energy consumption. When an endpoint has data to send it does so without any checks and then opens two successive listening windows for any messages coming from the LNS server. These two windows have recommended durations of 1 and then 2 seconds. These two windows are the only ones during which the server can send to the endpoint data that it previously stored for its attention. The class A must be implemented in all the endpoints for reasons of compatibility.

The class B allows good compromise between energy consumption and the need for bidirectional communication. The endpoints functioning in the class B open reception windows at intervals programmed by periodic messages sent by the LNS server.

The class C has the highest energy consumption since the endpoints are permanently listening out, which makes it possible to make communications at all times.

It should be noted that an item of equipment may change its class during operation.

A plurality of endpoints may contribute to the same application managed by the same application server. Currently, an application server wishing to acknowledge frames received from a plurality of endpoints for the same application must acknowledge each frame one by one. Apart from the tedious aspect of such an acknowledgement method, this method monopolises network resources in a not insignificant way.

It is desirable to overcome these drawbacks of the prior art. It is in particular desirable to propose an efficient acknowledgement method.

It is moreover desirable to propose a method that is simple to implement at low cost.

According to a first aspect of the present invention, the present invention relates to a method for acknowledging frames sent by endpoints in a group of endpoints intended for an application server, each endpoint in said group communicating with the application server via a gateway and a centralising server, the application server being connected to the centralising server via a first communication network, the centralising server being connected to each gateway by a second communication network, the group of endpoints and each gateway forming a third network of the long-range wireless network type affording low energy consumption, each communication between an endpoint in said group and a gateway using a communication protocol adapted to said third network. The method is executed by the centralising server and comprises: receiving at least one acknowledgement message sent by the application server, each acknowledgement message acknowledging a plurality of frames sent by endpoints in said group, each acknowledgement message comprising a plurality of fields, a first field comprising information allowing timesetting of each endpoint receiving the acknowledgement message, a second field comprising information fixing a time of next reawakening of each endpoint receiving the acknowledgement message, a third field comprising information representing an identifier of said group, said identifier having been supplied by the centralising server to each endpoint in said group during a phase of connection to the third network performed by said endpoint, and a fourth field comprising information indicating, for each endpoint in said group, whether each frame that it sent to the application server since a previous acknowledgement is acknowledged; and transmitting a frame in broadcast mode to said group via each gateway making it possible to communicate with an endpoint in said group, said frame comprising, for each field of each acknowledgement message received, information representing the information represented by said field.

By acknowledging a plurality of frames sent by the endpoints in a group of endpoints with a single frame sent in broadcast mode, the acknowledgement method does not monopolise the network resources.

According to one embodiment, when the centralising server receives a single acknowledgement message, the frame transmitted in broadcast mode comprises the acknowledgement message.

According to one embodiment, each frame intended to be transmitted in broadcast mode to said group comprises, in an endpoint address field of said frame, a predefined address, each endpoint receiving a frame comprising the predefined address identifying this frame as a frame sent in broadcast mode.

According to one embodiment, during the connection phase, the centralising server responds to each connection-request frame emanating from an endpoint in said group by a connection-enabling frame transmitted in unicast mode to the endpoint that transmitted the connection-request frame, the connection-enabling frame comprising the identifier of said group in an endpoint address field, a field comprising information enabling timesetting of the endpoint that is the destination of said enabling frame and a field fixing a time of next reawakening of said destination endpoint.

According to one embodiment, the fourth field takes the form of a binary mask wherein each bit corresponds to an endpoint in said group, the endpoint address field of said connection-enabling frame further comprising information indicating to the endpoint that is the destination of said connection-enabling frame a position in the binary mask of the bit corresponding to said destination endpoint.

According to one embodiment, when the application server implements a plurality of applications, each endpoint in said group being able to contribute to each application in the plurality of applications, each application implemented by the application server being associated with an application number known by each endpoint in said group, each acknowledgement message comprises a fifth field comprising an application identifier for identifying the application among the plurality of applications for which frames are acknowledged.

According to a second aspect of the invention, the invention relates to a method for acknowledging frames sent by endpoints in a group of endpoints intended for an application server, each endpoint in said group communicating with the application server via a gateway and a centralising server, the application server being connected to the centralising server via a first communication network, the centralising server being connected to each gateway by a second communication network, the group of endpoints and each gateway forming a third network of the long-range wireless network type affording low energy consumption, each communication between an endpoint in said group and a gateway using a communication protocol adapted to said third network. The method is executed by an endpoint, referred to as the current endpoint, in said group and comprises: receiving an acknowledgement frame, the acknowledgement frame having been transmitted in broadcast mode by the centralising server and comprising an acknowledgement message generated from information supplied by the application server, said message being identical for each endpoint in said group and composed of a plurality of fields, a first field comprising information allowing timesetting of the current endpoint, a second field fixing a time of next reawakening of the current endpoint, a third field comprising information representing an identifier of said group, said identifier having been supplied by the centralising server to the current endpoint during a phase of connection to the third network performed by the current endpoint, and a fourth field comprising information indicating to said current endpoint whether each frame that it has sent to the application server is acknowledged; setting a clock internal to said endpoint using the first field; if the identifier represented by the information representing the identifier of said group contained in the third field corresponds to the identifier received by the current endpoint during the connection phase, checking, using the fourth field, that each frame sent since a previous acknowledgement is acknowledged; and going on standby until the time of next reawakening indicated in the second field.

According to a third aspect of the invention, the invention relates to a method for acknowledging frames sent by endpoints in a group of endpoints to an application server, each endpoint in said group communicating with the application server via a gateway and the centralising server, the application server being connected to the centralising server via a first communication network, the centralising server being connected to each gateway by a second communication network, the group of endpoints and each gateway forming a third network of the long-range wireless network type affording low energy consumption, each communication between an endpoint in said group and a gateway using a communication protocol adapted to said third network. The method executed by the application server comprises: generating an acknowledgement message, the acknowledgement message comprising a plurality of fields, a first field comprising information allowing timesetting of each endpoint receiving said message, a second field comprising information fixing a time of next reawakening of each endpoint receiving said message, a third field comprising information representing an identifier of said group, said identifier having been supplied by the centralising server to each endpoint in said group during a phase of connection to the third network performed by said endpoint, and a fourth field comprising information indicating, for each endpoint in said group, whether each frame that it sent to the application server since a previous acknowledgement is acknowledged; and sending a frame comprising said message, the information included in each field of said message being intended to be transmitted to each endpoint in the group of endpoints via the centralising server and each gateway enabling the centralising server to communicate with each endpoint in the group of endpoints.

According to one embodiment, the long-range wireless network affording low energy consumption is a LoRa network and the communication protocol adapted to said network is the LoRaWAN protocol.

According to a fourth aspect of the invention, the invention relates to a device of the centralising server type, making it possible to acknowledge frames sent by endpoints in a group of endpoints to an application server, each endpoint in said group communicating with the application server via a gateway and the centralising server, the application server being connected to the centralising server via a first communication network, the centralising server being connected to each gateway by a second communication network, the group of endpoints and each gateway forming a third network of the long-range wireless network type affording low energy consumption, each communication between an end point in said group and a gateway using a communication protocol adapted to said third network. The device comprises: reception means for receiving an acknowledgement message sent by the application server, said message acknowledging a plurality of frames sent by endpoints in said group, the acknowledgement message comprising a plurality of fields, a first field comprising information allowing timesetting of each endpoint receiving said message, a second field comprising information fixing a time of next reawakening of each endpoint receiving said message, a third field comprising information representing an identifier of said group, said identifier having been supplied by the centralising server to each endpoint in said group during a phase of connection to the third network performed by said endpoint, and a fourth field comprising information indicating, for each endpoint in said group, whether each frame that it sent to the application server since a previous acknowledgement is acknowledged; and transmission means for transmitting a frame in broadcast mode to said group via each gateway making it possible to communicate with an endpoint in said group, said frame comprising, for each field of each acknowledgement message received, information representing the information represented by said field.

According to a fifth aspect of the invention, the invention relates to a device of the endpoint type belonging to a group of endpoints sending frames to an application server, each endpoint in said group communicating with the application server by a gateway and a centralising server, the application server being connected to the centralising server via a first communication network, the centralising server being connected to each gateway by a second communication network, the group of endpoints and each gateway forming a third network of the long-range wireless network type affording low energy consumption, each communication between an endpoint in said group and a gateway using a communication protocol adapted to said third network. The endpoint, referred to as the current endpoint, comprises: reception means for receiving an acknowledgement frame, the acknowledgement frame having been transmitted in broadcast mode by the centralising server and comprising an acknowledgement message generated from information supplied by the application server, said message being identical for each endpoint in said group and composed of a plurality of fields, a first field comprising information allowing timesetting of the current endpoint, a second field fixing a time of next reawakening of the current endpoint, a third field comprising information representing an identifier of said group, said identifier having been supplied by the centralising server to the current endpoint during a phase of connection to the third network performed by the current endpoint, and a fourth field comprising information indicating to said current endpoint whether each frame that it sent to the application server is acknowledged; means for setting a clock internal to said current endpoint using the first field; means for checking, using the fourth field and if the identifier represented by the information representing the identifier of said group contained in the third field corresponds to the identifier received by the current endpoint during the connection phase, that each frame sent is acknowledged; and standby means for putting the current endpoint on standby until the time of next reawakening indicated in the second field.

According to a sixth aspect of the invention, the invention relates to a device of the application server type adapted to acknowledge frames sent by endpoints in a group of endpoints to said application server, each endpoint in said group communicating with the application server via a gateway and the centralising server, the application server being connected to the centralising server via a first communication network, the centralising server being connected to each gateway by a second communication network, the group of endpoints and each gateway forming a third network of the long-range wireless network type affording low energy consumption, each communication between an endpoint in said group and a gateway using a communications protocol adapted to said third network. The device comprises: means for generating an acknowledgement message, the acknowledgement message comprising a plurality of fields, a first field comprising information allowing timesetting of each endpoint receiving said message, a second field fixing a time of next reawakening of each endpoint receiving said message, a third field comprising information representing an identifier of said group, said identifier having been supplied by a centralising server to each endpoint in said group during a phase of connection to the third network performed by said endpoint, and a fourth field comprising information indicating, for each endpoint in said group, whether each frame that it sent to the application server since a previous acknowledgement is acknowledged; said message being intended to be transmitted to each endpoint in the group of endpoints via a centralising server and each gateway enabling the centralising server to communicate with each endpoint in the group of endpoints.

According to a seventh aspect of the invention, the invention relates to a system comprising a group of endpoints according to the fifth aspect sending frames to an application server according to the sixth aspect, each endpoint in said group communicating with the application server via a gateway and a centralising server according to the fourth aspect, the application server being connected to the centralising server via a first communication network, the centralising server being connected to each gateway by a second communication network, the group of endpoints and each gateway forming a third network of the long-range wireless network type affording low energy consumption, each communication between an endpoint in said group and a gateway using a communication protocol adapted to said third network.

According to an eighth aspect of the invention, the invention relates to a computer program, characterised in that it comprises instructions for implementing, by a device, the method according to the first aspect, when said program is executed by a processor of said device.

According to a ninth aspect, the invention relates to storage means, storing a computer program comprising instructions for implementing, by a device, the method according to the first aspect, when said program is executed by a processor of said device.

The features of the invention mentioned above, as well as others, will emerge more clearly from a reading of the following description of an example embodiment, said description being given in relation to the accompanying drawings, among which:

The invention is described hereinafter in a context wherein an application server receives a plurality of frames sent by endpoints via gateways and an LNS server, the gateways and the endpoints forming a LoRa network. The invention however applies in other contexts for all types of long-range wireless network affording low energy consumption wherein a server must acknowledge frames transmitted by a plurality of endpoints, said endpoints usually being in a standby mode and temporarily passing to active mode.

Figure 1:
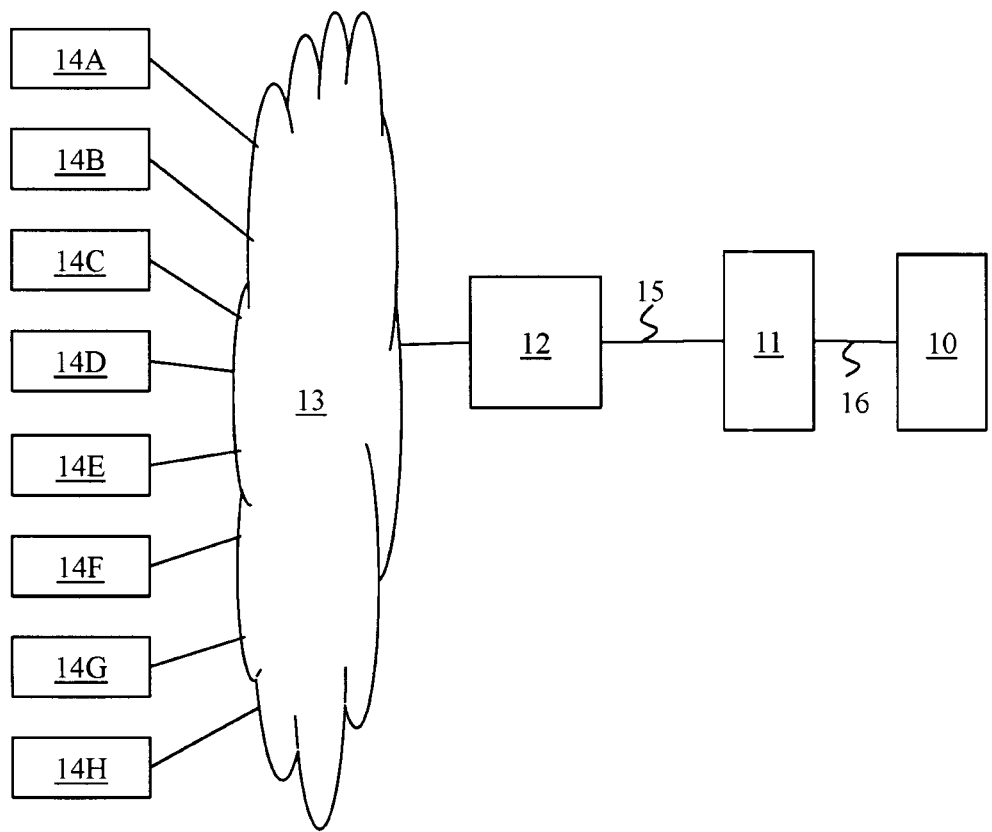
FIG. 1 illustrates schematically a system wherein the invention is implemented.

FIG. 1 illustrates schematically a system wherein the invention is implemented.

In the example in FIG. 1, a plurality of endpoints 14A, 14B, 14C, 14D, 14E, 14F, 14G and 14H are connected to a gateway 12 by a LoRa network 13. It should be noted that the communications on the wireless communication link 13 are in accordance with the LoRaWAN protocol.

The gateway 12 communicates with a server 11, called an LNS server, by means of a wire or wireless communication link 15.

The LNS server 11 is connected to one or more servers 10, called application servers, by means of a wire or wireless communication link 16.

In the example in FIG. 1, the plurality of endpoints 14A, 14B, 14C, 14D, 14E, 14F, 14G and 14H form a group of endpoints contributing to an application executed by the application server 10. This group of endpoints was for example defined by the application server 10. It should be noted that, in order to simplify FIG. 1, the group of endpoints comprises only eight endpoints. In a practical case, this group could be composed of a large number of endpoints. For example, the group of endpoints comprises 256 endpoints. In other embodiments, the group of endpoints could also comprise 512 or 1024 endpoints. Likewise, FIG. 1 shows only one gateway 12. In a practical case, the number of gateways could be greater and for example comprise around a hundred gateways.

Moreover, the application server 10 could execute a plurality of applications in parallel. Each endpoint in the group of endpoints could contribute to a plurality of applications, these applications being able to be executed by a plurality of application servers.

Figure 2A:
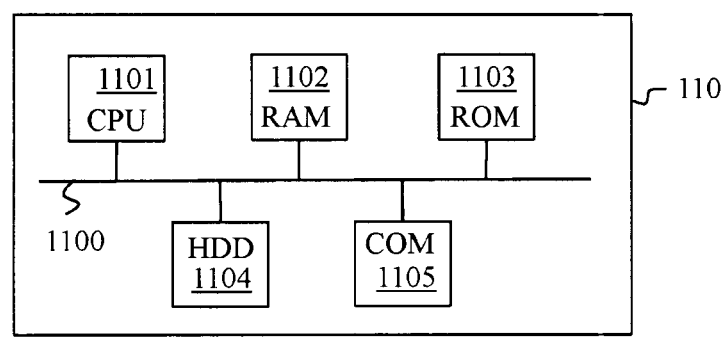
FIG. 2A illustrates schematically a processing module included in an LNS server.

FIG. 2A illustrates schematically an example of hardware architecture of a processing module 110 included in the LNS server 11.

According to the example of hardware architecture shown in FIG. 2A, the processing module 110 then comprises, connected by a communication bus 1100: a processor or CPU (central processing unit) 1101; a random access memory RAM 1102; a read only memory ROM 1103; a storage unit such as a hard disk or a storage medium reader, such as an SD (Secure Digital) card reader 1104; at least one communication interface 1105 enabling the processing module 110 to communicate with other devices such as the gateway 12 and the application server 10.

The processor 1101 is capable of executing instructions loaded in the RAM 1102 from the ROM 1103, from an external memory (not shown), from a storage medium (such as an SD card) or from a communication network. When the LNS server 11 is powered up, the processor 1101 is capable of reading instructions from the RAM 1102 and executing them. In one embodiment, these instructions form a computer program causing the complete or partial implementation, by the processor 1101, of the methods described below in relation to FIGS. 7 and 8.

Figure 2B:
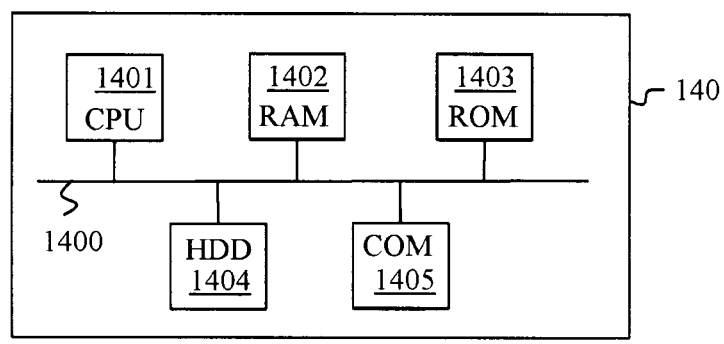
FIG. 2B illustrates schematically a processing module included in an endpoint.

FIG. 2B illustrates schematically an example of hardware architecture of a processing module 140 included in each endpoint in the group of endpoints.

According to the example of hardware architecture depicted in FIG. 2B, the processing module 140 then comprises, connected by a communication bus 1400: a processor or CPU (central processing unit) 1401; a random access memory RAM 1402; a read only memory ROM 1403; a storage unit such as a hard disk or a storage medium reader, such as an SD (Secure Digital) card reader 1404; at least one communication interface 1405 enabling the processing module 140 to communicate with other devices such as the gateway 12.

The processor 1401 is capable of executing instructions loaded in the RAM 1402 from the ROM 1403, from an external memory (not shown), from a storage medium (such as an SD card) or from a communication network. When the endpoint is powered up, the processor 1401 is capable of reading instructions from the RAM 1402 and executing them. In one embodiment, these instructions form a computer program causing the complete or partial implementation, by the processor 1401, of the methods described below in relation to FIGS. 7 and 8.

Figure 2C:
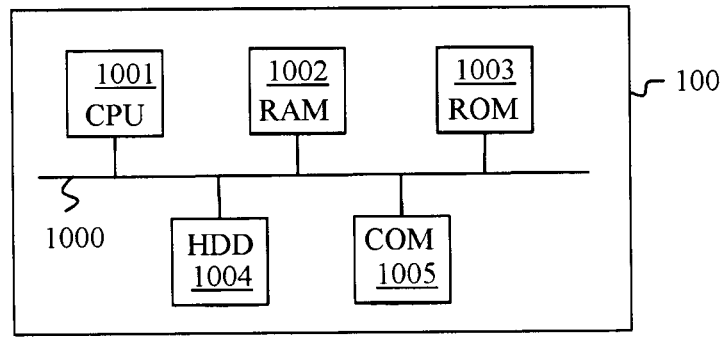
FIG. 2C illustrates schematically a processing module included in an application server.

FIG. 2C illustrates schematically an example of hardware architecture of a processing module 100 included in the application server 10.

According to the example of hardware architecture depicted in FIG. 2C, the processing module 100 then comprises, connected by a communication bus 1000: a processor or CPU (central processing unit) 1001; a random access memory RAM 1002; a read only memory ROM 1003; a storage unit such as a hard disk or a storage medium reader, such as an SD (Secure Digital) card reader 1004; at least one communication interface 1005 enabling the processing module 100 to communicate with other devices such as the LNS server 11.

The processor 1001 is capable of executing instructions loaded in the RAM 1002 from the ROM 1003, from an external memory (not shown), from a storage medium (such as an SD card) or from a communication network. When the endpoint is powered up, the processor 1001 is capable of reading instructions from the RAM 1002 and executing them. In one embodiment, these instructions form a computer program causing the complete or partial implementation, by the processor 1001, of the methods described below in relation to FIGS. 7 and 8.

Figure 7:
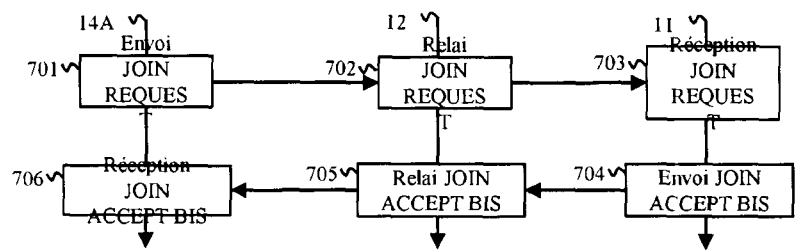
FIG. 7 illustrates schematically a procedure for connection to a LoRa network according to the invention.
Figure 8:
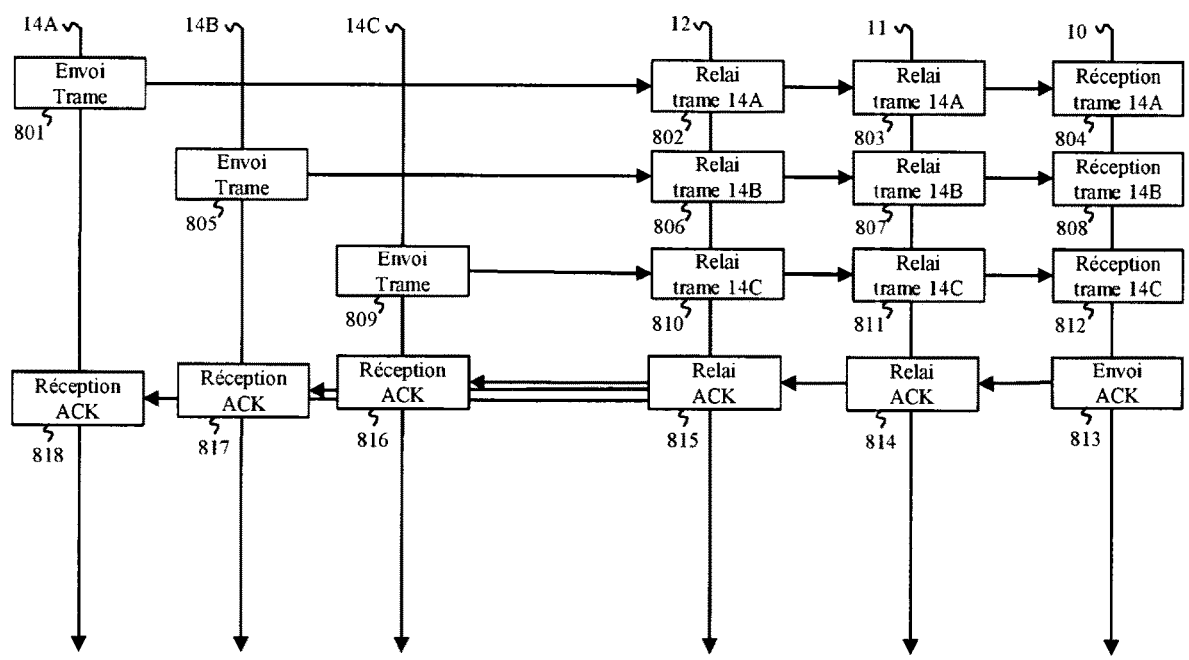
FIG. 8 illustrates schematically a functioning of an acknowledgement procedure according to the invention.

The methods described in relation to FIGS. 7 and 8 can be implemented in software form by the execution of a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

FIG. 7 illustrates schematically a phase of connection to a LoRa network according to the invention.

FIG. 7 depicts a connection phase executed by the endpoint 14A. However, each endpoint 14B, 14C, 14D, 14E, 14F, 14G and 14H executes the same connection phase when it is connected to the LoRa network. This phase is for example launched by an operator when an endpoint is installed.

In a step 701, the processing module 140 of the endpoint 14A causes a sending of an uplink LoRa frame in broadcast mode corresponding to a request for connection to the LoRa network. The uplink LoRa frame comprises a JOIN REQUEST message as defined in the LoRaWAN protocol.

In a step 702, the gateway 12 receives the uplink LoRa frame comprising the JOIN REQUEST message and relays the JOIN REQUEST message in an uplink HTTP frame intended for the LNS server 11.

In a step 703, the LNS server 11 receives the uplink HTTP frame containing the JOIN REQUEST message.

In a step 704, the processing module 110 of the LNS server 11 causes a sending of a unicast response to the JOIN REQUEST message intended for the endpoint 14A. The response takes the form of a connection-enabling message adapted to the invention, which we hereinafter refer to as JOIN ACCEPT BIS. The JOIN ACCEPT BIS message is very similar to the JOIN ACCEPT message as defined in the LoRaWAN protocol.

Figure 3:
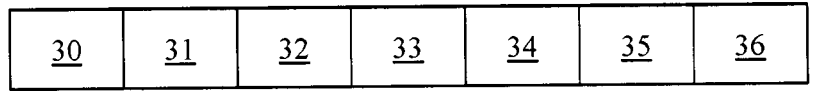
FIG. 3 illustrates schematically a connection-enabling message according to the invention.

FIG. 3 illustrates schematically a connection-enabling message according to the invention.

The JOIN ACCEPT BIS message comprises fields 30, 31, 33 and 34 defined in the LoRaWAN protocol. The field 30, coded in 3 bytes, corresponds to the JoinNonce field, the field 31, coded in 3 bytes, corresponds to the Home_NetID field. The field 33 coded in one byte corresponds to the field DLSettings, and the field 34 coded in one byte corresponds to the field RxDelay. The message JOIN ACCEPT BIS also comprises a field, called endpoint address, 32 coded in four bytes corresponding to a modified version of the field DevAddr.

Figure 4:
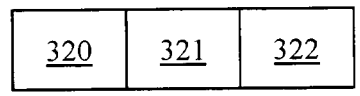
FIG. 4 illustrates schematically an endpoint-address field of the connection-enabling frame.

FIG. 4 illustrates schematically an endpoint address field of the connection-enabling message.

The endpoint address field 32 is composed of three subfields. A first subfield 320 corresponds to the NWK field defined by the LoRaWAN protocol. A second subfield 321 comprises an address, called top address, coded in 17 bits, representing an address allocated to the group of endpoints formed by the endpoints 14A, 14B, 14C, 14D, 14E, 14F, 14G and 14H. In one embodiment, the top address was supplied to the LNS server 11 by the application server 10. A third subfield 322 comprises an address, called bottom address, coded in eight bits. The bottom address represents an identifier of the endpoint 14A in the group of endpoints. It should be noted that the number of bits in the bottom address makes it possible to give a different identifier to each endpoint in the group of endpoints when the group of endpoints comprises 256 endpoints. When, in one embodiment, the group of endpoints comprises 512 or 1024 endpoints, the number of bits of the bottom address changes respectively from 9 to 10 bits. In this case, the number of bits of the top address is reduced accordingly and changes respectively to 16 and 15 bits. In one embodiment, the bottom address corresponding to each endpoint was supplied to the LNS server 11 by the application server 10.

Returning to FIG. 3, the JOIN ACCEPT BIS message also comprises a field 35 transporting information allowing the timesetting of the endpoint 14A coded in 32 bits and a field 36 coded in 32 bits comprising information fixing a time of next reawakening of the endpoint 14A. The time of the next reawakening is here coded absolutely. In one embodiment, the time of next awakening could be coded relatively with respect to the information allowing a timesetting contained in the field 35. In this case, the time of next reawakening could be coded in 24 bits.

Returning to FIG. 7, the processing module 110 of the LNS server 11 inserts the JOIN ACCEPT BIS message in a downlink HTTP frame in the step 704 and causes the sending of this downlink HTTP frame in unicast mode to the gateway 12.

In a step 705, the gateway 12 receives the downlink HTTP frame comprising the JOIN ACCEPT BIS message. In the step 705, the gateway 12 inserts the JOIN ACCEPT BIS message in a downlink LoRa frame and transmits this downlink LoRa frame in unicast mode to the endpoint 14A.

In a step 706, the endpoint 14A receives the downlink LoRa frame comprising the JOIN ACCEPT BIS message. The processing module 140 of the endpoint 14A saves the top address contained in the field 321 and the identifier thereof in the group of endpoints contained in the field 322. Moreover, the processing module 140 sets an internal clock contained in the endpoint 14A with the information contained in the field 35, records the time of next reawakening contained in the field 36 and goes on standby until said time of next reawakening. It should be noted that, in each reawakening period, each endpoint temporarily goes into class C and then returns to class A.

At the end of the connection phase, the endpoint 14A therefore knows the address of a group to which it belongs and its identifier in the group.

FIG. 8 illustrates schematically a functioning of an acknowledgement procedure according to the invention.

In FIG. 8, only the endpoints 14A, 14B and 14C are depicted. It should be noted that the other endpoints in the group of endpoints behave in the same way as the endpoints 14A, 14B and 14C.

In a step 801, the processing module 140 of the endpoint 14A causes a sending of a message, called application message, to the application server 10. In the step 801, the message is inserted in an uplink LoRa frame that is sent in unicast mode to the gateway 12.

In a step 802, the gateway 12 receives the uplink LoRa frame containing the application message. In the step 802, the gateway 12 receives the uplink LoRa frame containing the application message. In the step 802, the gateway 12 inserts the application message in an uplink HTTP frame and sends the uplink HTTP frame in unicast mode to the LNS server 11.

In a step 803, the LNS server 11 receives the uplink HTTP frame containing the application message and relays this frame in the direction of the application server 10.

In parallel, the endpoint 14B (and respectively 14C) performs a step 805 (and respectively 809) identical to the step 801 in order to send an application message. Following the sending of this application message, the gateway 12, the LNS server 11 and the application server 10 respectively perform steps 806, 807, 808 (and respectively 810, 811, 812) identical to the steps 802, 803, 804. Following the steps 804, 808 and 812, the application server 10 has received three application messages.

In a step 813, the processing module 100 of the application server 10 generates an acknowledgement message intended to acknowledge each application message transmitted by an endpoint in the group of endpoints since a last acknowledgement. During the step 813, the acknowledgement message is inserted in a downlink HTTP frame sent in broadcast mode. Hereinafter the downlink HTTP frame transporting an acknowledgement message is referred to as acknowledgement HTTP frame.

Figure 6:
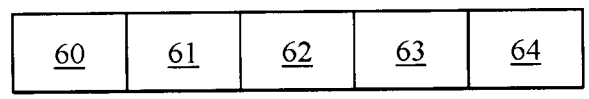
FIG. 6 illustrates schematically an acknowledgement message.

FIG. 6 illustrates schematically an acknowledgement message.

The acknowledgement message comprises a plurality of fields. A first field 60, coded in 32 bits, comprises information allowing timesetting of each endpoint receiving the acknowledgement message. A second field 61, coded in 32 bits, fixes a time of next reawakening of each endpoint receiving the acknowledgement message. A third field 62 comprises five reserved bits. A fourth field 63 comprises information representing an identifier of the group of endpoints that the application server 10 addresses. Here the group of endpoints is formed by the endpoints 14A, 14B, 14C, 14D, 14E, 14F, 14G and 14H. This identifier is the top address included in the field 321 that was supplied during the connection phase. A fifth field 64, coded in 256 bits when the group of endpoints concerned comprises 256 endpoints, comprises information indicating, for each endpoint in said group, whether the frame that it sent to the application server since a previous acknowledgement is acknowledged. Here the frames sent since the previous acknowledgement comprise the uplink LoRa frames comprising an application message sent during the steps 801, 802 and 803.

In one embodiment, the field 64 takes the form of a binary mask in which each bit corresponds to an endpoint in the group of endpoints. The bottom address received during the connection phase by each endpoint in the group of endpoints corresponds to the position of the bit corresponding to said endpoint in the binary mask.

Returning to FIG. 8, in the step 813, the processing module 100 of the application server 10 transmits the acknowledgement HTTP frame in the direction of the LNS server 11.

In a step 814, the LNS server 11 receives the acknowledgement HTTP frame. In one embodiment, the LNS server 11 forms a MAC message as described in section 4 of the LoRaWAN protocol (LoRaWAN 1.1 Specification, final release, 11 Oct. 2017) in which the acknowledgement is inserted in a subpart of the FRMPayload type of a payload of the MACPayload type. Moreover, in order to form a frame intended to be transmitted in broadcast mode, the DevAddr field of the frame header described in section 4.3.1 of the LoRaWAN protocol takes the form described in relation to FIG. 5.

Figure 5:
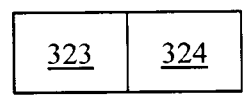
FIG. 5 illustrates schematically an endpoint-address field of an acknowledgement frame.

FIG. 5 illustrates schematically an endpoint address field DevAddr of an acknowledgement frame.

The field DevAddr of an acknowledgement frame is divided into two subfields. A first subfield 323 corresponds to the field NWK defined by the LoRaWAN protocol. A second subfield 324 comprises a predefined address representing a transmission in broadcast mode, coded in 27 bits. Thus an endpoint receiving a frame comprising such a predefined address recognises that this frame was transmitted in broadcast mode. In one embodiment, all the bits of the predefined address representing a transmission in broadcast mode are at 1.

Once formed, the processing module 110 of the LNS server 11 inserts the MAC message in a downlink HTTP frame and transmits this downlink HTTP frame in the direction of the gateway 12.

In a step 815, the gateway 12 receives the HTTP frame containing the MAC message containing the acknowledgement message. In the step 815, the MAC message is inserted in a downlink LoRa frame. The downlink LoRa frame comprising the MAC message comprising the acknowledgement message is transmitted in broadcast mode to the endpoints in the group of endpoints.

In a step 818 (and respectively 817 and 186), the endpoint 14A (and respectively 14B and 14C) receives the downlink LoRa frame comprising the MAC message comprising the acknowledgement message.

Following the reception of the acknowledgement frame, the endpoint 14A (and respectively 14B and 14C) sets a clock internal to the endpoint using the field 60 of the acknowledgement message and saves the time of next reawakening contained in the field 61. If the identifier included in the field 63 corresponds to the top address of the group of endpoints received by the endpoint 14A (and respectively 14B and 14C) during the connection phase, the processing module 140 of said endpoint 14A (and respectively 14B and 14C) considers that the downlink LoRa frame comprising the MAC message comprising the acknowledgement message concerns it. In this case, it checks, using the field 64, whether the frame that it sent since the previous acknowledgement is acknowledged. To do this, it seeks in the binary mask the bit corresponding to the bottom address represented by the field 322 that it received during the connection phase. If this bit is at 1, the frame is considered to be acknowledged. Otherwise the frame is considered to be lost. In the case of a lost frame, the processing module 140 of the endpoint 14A (and respectively 14B and 14C) causes the re-sending of the lost frame.

The processing module 140 of the endpoint 14A (and respectively 14B and 14C) next causes said endpoint to go on standby until the next wake-up date. There also, each endpoint goes temporarily into class C when it is woken up and then goes into class A again.

If the processing module 140 of the endpoint 14A (and respectively 14B and 14C) considers that the downlink LoRa frame comprising the MAC message comprising the acknowledgement message does not concern it, it ignores the field 64 and directly causes said endpoint to go on standby until the next wake-up date.

In one embodiment, each endpoint has transmitted more than one frame since the previous acknowledgement. In this case, the acknowledgement frame makes it possible to acknowledge each frame transmitted since the previous acknowledgement.

In one embodiment, the application server 10 transmits a plurality of successive acknowledgement messages to the LNS server 11, each acknowledgement message concerning different endpoints in the group of endpoints. The LNS server 10 then receives a plurality of acknowledgement messages and forms an acknowledgement message, referred to as a concatenated acknowledgement message, from the plurality of acknowledgement messages that it has received. Each bit of the binary mask of the concatenated acknowledgement message takes the value 1 when a bit situated at the same position in one of the binary masks of an acknowledgement message in the plurality of acknowledgement messages is at the value 1. The fields 60, 61, 62 and 63 being identical in each acknowledgement message, the fields 60, 61, 62 and 63 of one of the acknowledgement messages in the plurality of acknowledgement messages are copied into the concatenated acknowledgement message. Thus the frame transmitted in broadcast mode in the step 814 comprises, for each field (i.e. for the fields 60, 61, 62, 63, 64) of each acknowledgement message, representative information (i.e. representing the fields 60, 61, 62, 63 and 64) comprising information representing the information represented by said field.

In one embodiment, the application server directly forms the MAC message comprising the acknowledgement message. Thus the downlink HTTP frame transmitted in the step 813 comprising the MAC message comprising the acknowledgement message is relayed without being modified by the LNS server 11.

In one embodiment, the field 62 of the acknowledgement message represents an identifier of a function making it possible to encrypt the top address of a group of endpoints. The field 62 comprising five bits, it makes it possible to give an identifier to 32 different functions. One encryption method is for example a right-hand circular rotation of the bits of the top address by a number of bits obtained by converting the field 62, i.e. by converting the binary number represented by the field 62 into a decimal value. Thus, in this embodiment, the identifier represented by the field 63 in the acknowledgement message is not directly the top address but an encrypted version of this top address. Moreover, each endpoint knows the encryption function corresponding to each possible value of the field 62. Each end point can thus decipher the identifier represented by the field 63 in order to compare the value obtained at the top address that it obtained during the connection phase.

In one embodiment, when the application server 10 implements a plurality of applications or when an endpoint contributes to a plurality of applications, the field 62 is divided into two parts, one part of the bits of the field 62 (for example 3) being intended to identify an encryption function and another part of the bits (for example 2) being intended to identify an application. Preferentially, the field FPort defined in the field MACPayload itself defined in the LoRaWAN protocol (LoRaWAN 1.1 Specification, final release, 11 Oct. 2017) makes it possible to identify the application that is acknowledging.

The invention claimed is:

1. A method for acknowledging frames sent by endpoints in a group of endpoints intended for an application server, each endpoint in said group communicating with the application server via a gateway and a centralising server, the application server being connected to the centralising server via a first communication network, the centralising server being connected to each gateway by a second communication network, the group of endpoints and each gateway forming a third network of a long-range wireless network type affording low energy consumption, each communication between an endpoint in said group and a gateway using a communication protocol adapted to said third network, wherein the method is executed by the centralising server and comprises:

receiving at least one acknowledgement message sent by the application server, each acknowledgement message acknowledging a plurality of frames sent by endpoints in said group, each acknowledgement message comprising a plurality of fields, a first field comprising information allowing timesetting of each endpoint receiving the acknowledgement message, a second field comprising information fixing a time of next reawakening of each endpoint receiving the acknowledgement message, a third field comprising information representing an identifier of said group, said identifier having been supplied by the centralising server to each endpoint in said group during a phase of connection to the third network performed by said endpoint, and a fourth field comprising information indicating, for each endpoint in said group, whether each frame that it sent to the application server since a previous acknowledgement is acknowledged; and transmitting a frame in broadcast mode to said group via each gateway making it possible to communicate with an endpoint in said group, said frame comprising, for each field of each acknowledgement message received, information representing the information represented by said field.

2. The method according to claim 1, wherein, when the centralising server receives a single acknowledgement message, the frame transmitted in broadcast mode comprises the acknowledgement message.

3. The method according to claim 1, wherein each frame intended to be transmitted in broadcast mode to said group comprises, in an endpoint address field of said frame, a predefined address, each endpoint receiving a frame comprising the predefined address identifying this frame as a frame sent in broadcast mode.

4. The method according to claim 1, wherein during the connection phase, the centralising server responds to each connection-request frame emanating from an endpoint in said group by a connection-enabling frame transmitted in unicast mode to the endpoint that transmitted the connection-request frame, the connection-enabling frame comprising the identifier of said group in an endpoint address field, a field comprising information enabling timesetting of the endpoint that is the destination of said enabling frame and a field fixing a time of next reawakening of said destination endpoint.

5. The method according to claim 4, wherein the fourth field takes the form of a binary mask wherein each bit corresponds to an endpoint in said group, the endpoint address field of said connection-enabling frame further comprising information indicating to the endpoint that is the destination of said connection-enabling frame a position in the binary mask of the bit corresponding to said destination endpoint.

6. The method according to claim 1, wherein when the application server implements a plurality of applications, each endpoint in said group being able to contribute to each application in the plurality of applications, each application implemented by the application server being associated with an application number known by each endpoint in said group, each acknowledgement message comprises a fifth field comprising an application identifier for identifying the application among the plurality of applications for which frames are acknowledged.

7. The method according to claim 1, wherein the long-range wireless network affording low energy consumption is a LoRa network and the communication protocol adapted to said network is the LoRaWAN protocol.

8. A non-transitory storage media that stores a computer program comprising instructions for implementing, by a device, the method according to claim 1, when said program is executed by a processor of said device.

9. A method for acknowledging frames sent by endpoints in a group of endpoints intended for an application server, each endpoint in said group communicating with the application server via a gateway and a centralising server, the application server being connected to the centralising server via a first communication network, the centralising server being connected to each gateway by a second communication network, the group of endpoints and each gateway forming a third network of a long-range wireless network type affording low energy consumption, each communication between an endpoint in said group and a gateway using a communication protocol adapted to said third network, wherein the method is executed by an endpoint, referred to as the current endpoint, in said group and comprises:

receiving an acknowledgement frame, the acknowledgement frame having been transmitted in broadcast mode by the centralising server and comprising an acknowledgement message generated from information supplied by the application server, said message being identical for each endpoint in said group and composed of a plurality of fields, a first field comprising information allowing timesetting of the current endpoint, a second field fixing a time of next reawakening of the current endpoint, a third field comprising information representing an identifier of said group, said identifier having been supplied by the centralising server to the current endpoint during a phase of connection to the third network performed by the current endpoint, and a fourth field comprising information indicating to said current endpoint whether each frame that it has sent to the application server is acknowledged;

setting a clock internal to said endpoint using the first field;

if the identifier represented by the information representing the identifier of said group contained in the third field corresponds to the identifier received by the current endpoint during the connection phase, checking, using the fourth field, that each frame sent since a previous acknowledgement is acknowledged; and going on standby until the time of next reawakening indicated in the second field.

10. A method for acknowledging frames sent by endpoints in a group of endpoints to an application server, each endpoint in said group communicating with the application server via a gateway and the centralising server, the application server being connected to the centralising server via a first communication network, the centralising server being connected to each gateway by a second communication network, the group of endpoints and each gateway forming a third network of a long-range wireless network type affording low energy consumption, each communication between an endpoint in said group and a gateway using a communication protocol adapted to said third network, wherein the method executed by the application server comprises:

generating an acknowledgement message, the acknowledgement message comprising a plurality of fields, a first field comprising information allowing timesetting of each endpoint receiving said message, a second field comprising information fixing a time of next reawakening of each endpoint receiving said message, a third field comprising information representing an identifier of said group, said identifier having been supplied by the centralising server to each endpoint in said group during a phase of connection to the third network performed by said endpoint, and a fourth field comprising information indicating, for each endpoint in said group, whether each frame that it sent to the application server since a previous acknowledgement is acknowledged; and sending a frame comprising said message, the information included in each field of said message being intended to be transmitted to each endpoint in the group of endpoints via the centralising server and each gateway enabling the centralising server to communicate with each endpoint in the group of endpoints.

11. A device of the centralising server type, making it possible to acknowledge frames sent by endpoints in a group of endpoints to an application server, each endpoint in said group communicating with the application server via a gateway and the centralising server, the application server being connected to the centralising server via a first communication network, the centralising server being connected to each gateway by a second communication network, the group of endpoints and each gateway forming a third network of a long-range wireless network type affording low energy consumption, each communication between an end point in said group and a gateway using a communication protocol adapted to said third network, wherein the device comprises:

a server configured for:
receiving an acknowledgement message sent by the application server, said message acknowledging a plurality of frames sent by endpoints in said group, the acknowledgement message comprising a plurality of fields, a first field comprising information allowing timesetting of each endpoint receiving said message, a second field comprising information fixing a time of next reawakening of each endpoint receiving the payload, a third field comprising information representing an identifier of said group, said identifier having been supplied by the centralising server to each endpoint in said group during a phase of connection to the third network performed by said endpoint, and a fourth field comprising information indicating, for each endpoint in said group, whether each frame that it sent to the application server since a previous acknowledgement is acknowledged; and transmitting a frame in broadcast mode to said group via each gateway making it possible to communicate with an endpoint in said group, said frame comprising, for each field of each acknowledgement message received, information representing the information represented by said field.

12. A system comprising a group of endpoints sending frames to an application server, each endpoint in said group communicating with the application server via a gateway and a centralising server according to claim 11, the application server being connected to the centralising server via a first communication network, the centralising server being connected to each gateway by a second communication network, the group of endpoints and each gateway forming a third network of the long-range wireless network type affording low energy consumption, each communication between an endpoint in said group and a gateway using a communication protocol adapted to said third network.

13. A device of the endpoint type belonging to a group of endpoints sending frames to an application server, each endpoint in said group communicating with the application server by a gateway and a centralising server, the application server being connected to the centralising server via a first communication network, the centralising server being connected to each gateway by a second communication network, the group of endpoints and each gateway forming a third network of a long-range wireless network type affording low energy consumption, each communication between an endpoint in said group and a gateway using a communication protocol adapted to said third network, wherein the endpoint, referred to as the current endpoint, comprises:

a server configured for:
receiving an acknowledgement frame, the acknowledgement frame having been transmitted in broadcast mode by the centralising server and comprising an acknowledgement message generated from information supplied by the application server, said message being identical for each endpoint in said group and composed of a plurality of fields, a first field comprising information allowing timesetting of the current endpoint, a second field fixing a time of next reawakening of the current endpoint, a third field comprising information representing an identifier of said group, said identifier having been supplied by the centralising server to the current endpoint during a phase of connection to the third network performed by the current endpoint, and a fourth field comprising information indicating to said current endpoint whether each frame that it sent to the application server is acknowledged;

setting a clock internal to said current endpoint using the first field;

checking, using the fourth field and if the identifier represented by the information representing the identifier of said group contained in the third field corresponds to the identifier received by the current endpoint during the connection phase, that each frame sent is acknowledged; and putting the current endpoint on standby until the time of next reawakening indicated in the second field.

14. A system comprising a group of endpoints according to claim 13, sending frames to an application server, each endpoint in said group communicating with the application server via a gateway and a centralising server, the application server being connected to the centralising server via a first communication network, the centralising server being connected to each gateway by a second communication network, the group of endpoints and each gateway forming a third network of the long-range wireless network type affording low energy consumption, each communication between an endpoint in said group and a gateway using a communication protocol adapted to said third network.

15. A device of the application server type adapted to acknowledge frames sent by endpoints in a group of endpoints to said application server, each endpoint in said group communicating with the application server via a gateway and the centralising server, the application server being connected to the centralising server via a first communication network, the centralising server being connected to each gateway by a second communication network, the group of endpoints and each gateway forming a third network of a long-range wireless network type affording low energy consumption, each communication between an endpoint in said group and a gateway using a communications protocol adapted to said third network, wherein the device comprises:

a server configured for generating an acknowledgement message, the acknowledgement message comprising a plurality of fields, a first field comprising information allowing timesetting of each endpoint receiving said message, a second field fixing a time of next reawakening of each endpoint receiving said message, a third field comprising information representing an identifier of said group, said identifier having been supplied by a centralising server to each endpoint in said group during a phase of connection to the third network performed by said endpoint, and a fourth field comprising information indicating, for each endpoint in said group, whether each frame that it sent to the application server since a previous acknowledgement is acknowledged;

said message being intended to be transmitted to each endpoint in the group of endpoints via a centralising server and each gateway enabling the centralising server to communicate with each endpoint in the group of endpoints.

16. A system comprising a group of endpoints sending frames to an application server according to claim 15, each endpoint in said group communicating with the application server via a gateway and a centralising server, the application server being connected to the centralising server via a first communication network, the centralising server being connected to each gateway by a second communication network, the group of endpoints and each gateway forming a third network of the long-range wireless network type affording low energy consumption, each communication between an endpoint in said group and a gateway using a communication protocol adapted to said third network.

* * * * *